Nov. 5, 1957 — C. KOENIG — 2,812,005
MACHINE FOR ATTACHING AN ADHESIVE STRIP TO A TWO-DIMENSIONAL ARTICLE
Filed Sept. 9, 1953 — 5 Sheets-Sheet 1
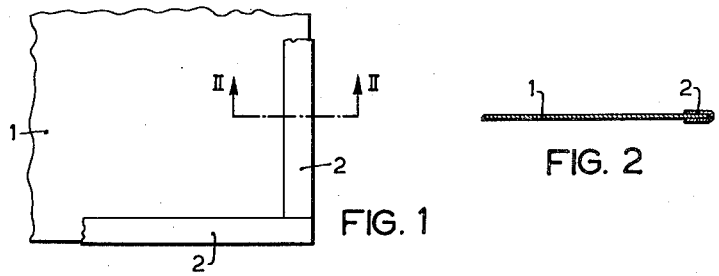
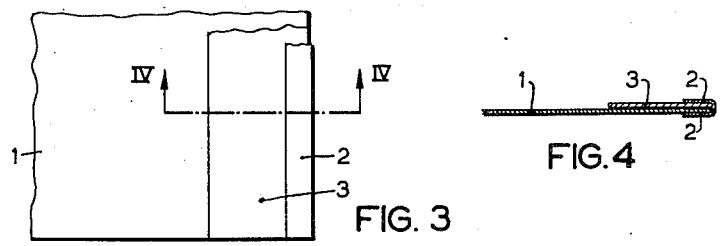
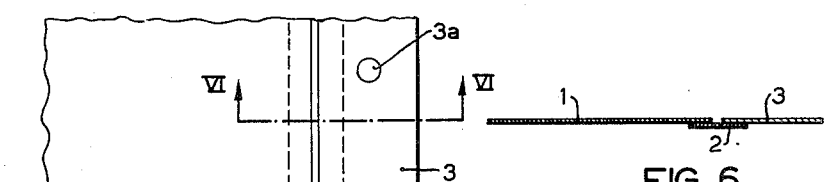
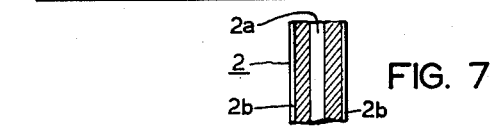
Inventor: Claus Koenig Nov. 5, 1957　　　C. KOENIG　　　2,812,005
MACHINE FOR ATTACHING AN ADHESIVE STRIP
TO A TWO-DIMENSIONAL ARTICLE
Filed Sept. 9, 1953　　　　　　　5 Sheets-Sheet 2
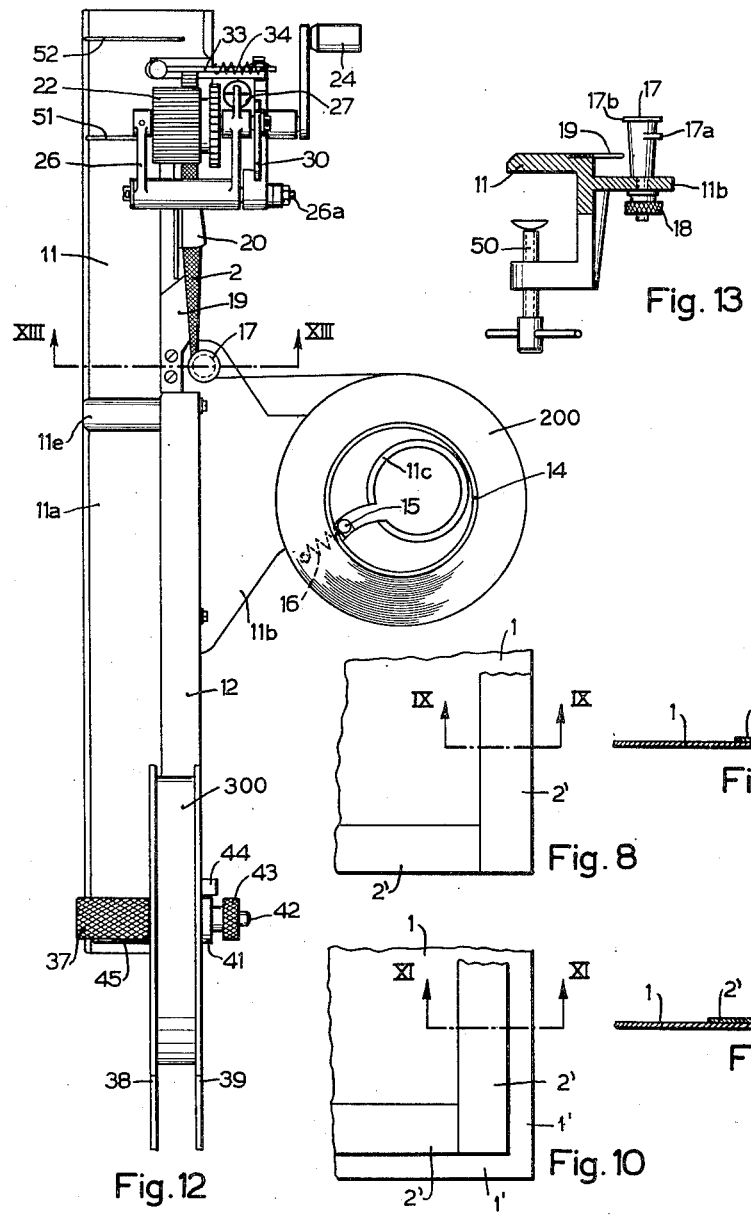
Inventor:-
Claus Koenig

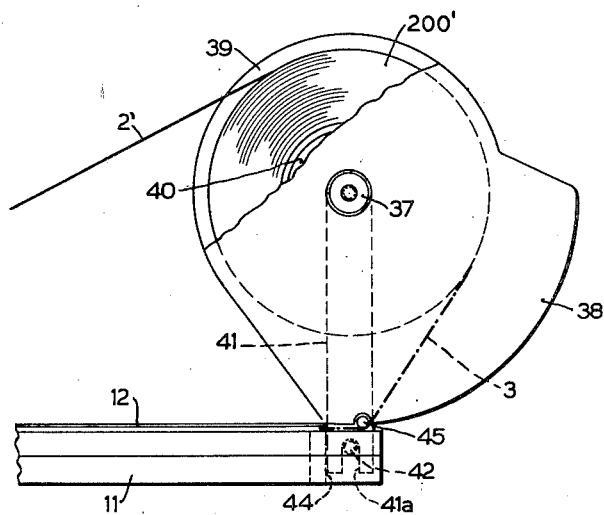
Fig. 14
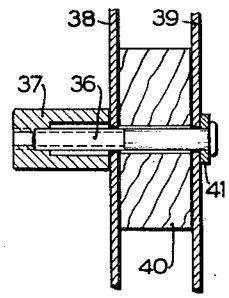
Fig. 15
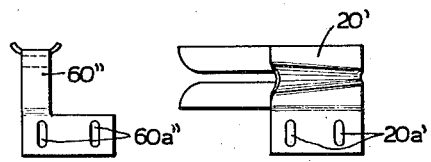
Fig. 25    Fig. 26
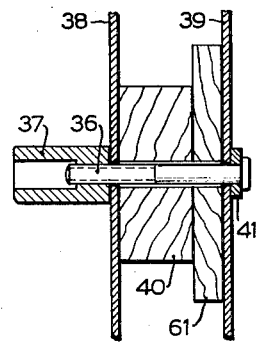
Fig. 16
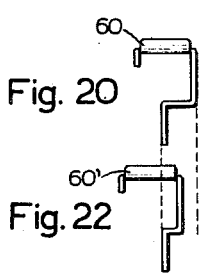
Fig. 20   Fig. 21
Fig. 22
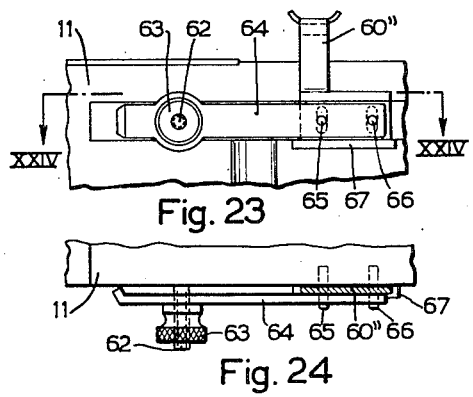
Fig. 23
Fig. 24

Nov. 5, 1957 C. KOENIG 2,812,005
MACHINE FOR ATTACHING AN ADHESIVE STRIP
TO A TWO-DIMENSIONAL ARTICLE
Filed Sept. 9, 1953 5 Sheets-Sheet 4

Inventor:-
Claus Koenig

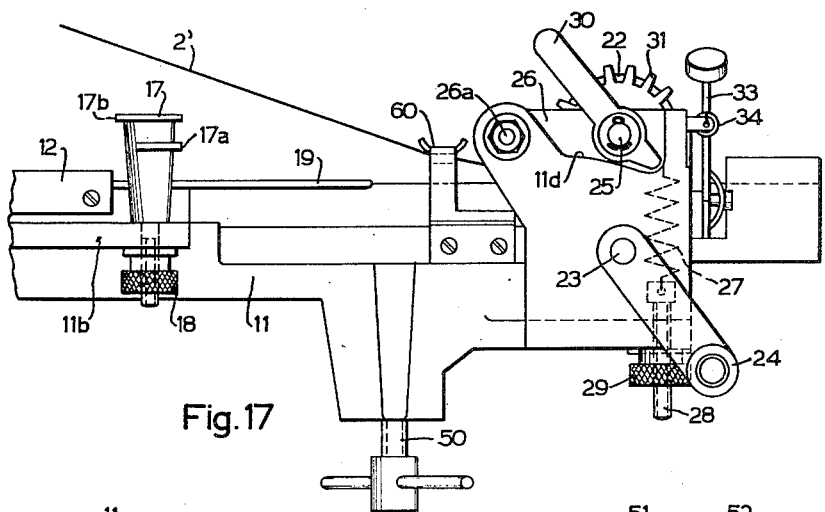
Fig. 17
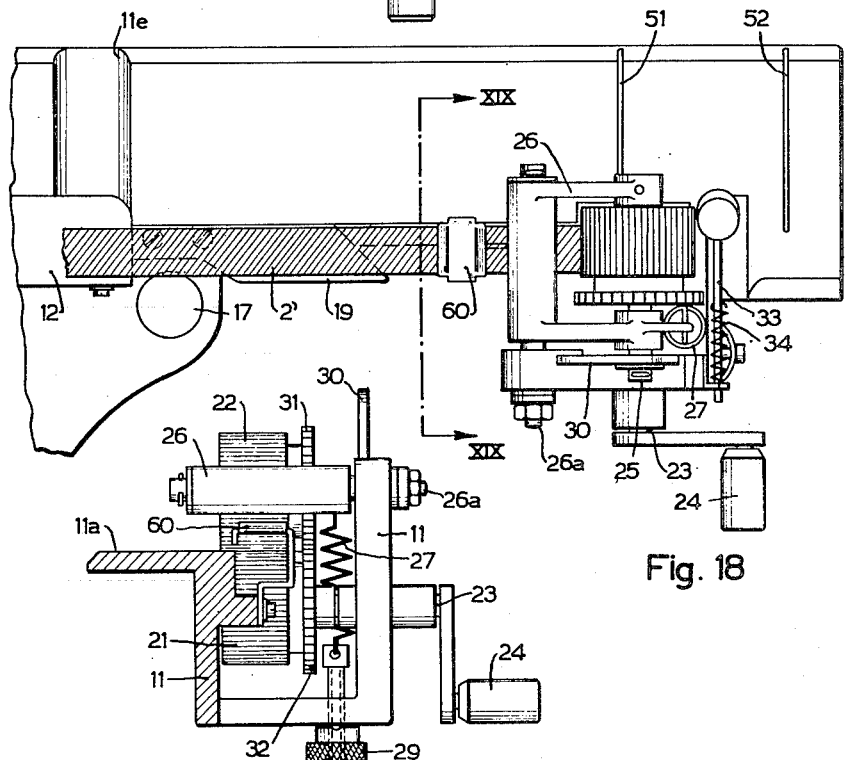
Fig. 18
Fig. 19

United States Patent Office 2,812,005
Patented Nov. 5, 1957

2,812,005

MACHINE FOR ATTACHING AN ADHESIVE STRIP TO A TWO-DIMENSIONAL ARTICLE

Claus Koenig, Erlangen, Germany

Application September 9, 1953, Serial No. 379,240

Claims priority, application Germany September 13, 1952

16 Claims. (Cl. 154—1.6)

The edges of drawings, envelopes and other two-dimensional articles are frequently reenforced by adhesive tape, particularly self-adhering tape, for protection against tearing. It is also possible to frame envelopes and other wrappings with such adhesive tape in order to seal them.

So called "edge-protecting machines" have become known for the above-mentioned purposes. In such machines the adhesive tape passes from a supply roller to a creasing device and a pressure device by means of which the tape is placed around the edge of the two-dimensional article, for example a drawing, fed through the machine. As a rule, the pressure device comprises a feed roller and a pressure rollers, and operates to impart feeding movement to the adhesive tape and to the article.

Recently, filing methods have become known according to which a so-called carrier strip is atached to a sheet of drawing or a similar two-dimensional article, flush with the edge thereof. This strip is then provided with file-fastener holes and is used for filing the drawing in suspended position. In the simplest form, the carrier strip can be connected with the sheet or other two-dimensional article by adhesive tape fastened to the sheet and to the supporting strip so that the center line of the tape exactly or substantially coincides with the junction between the sheet and the carrier strip.

It is an object of my invention to provide a tape-sticking machine which can selectively be used for both above-mentioned purposes, that is to say, for framing a two-dimensional article at the edge with adhesive tape and also for joining a drawing or the like with a carrier strip by means of adhesive tape.

To this end, and in accordance with a feature of my invention, I equip a machine, generally of the above-mentioned edge-protecting type, with carrier-strip supply means that coact with the creasing device and pressure device of the machine. According to a more specific feature of my invention, I provide the machine with a carrier-strip supply roller so as to permit a carrier strip to travel together with the article into the crease of the adhesive tape, thus joining the article and the carrier strip with each other by the adhesive tape.

For many purposes, however, it is also necessary to apply adhesive tape to the sheet of drawing or other article in such manner that, depending upon the particular requirements, the outer edge of the adhesive tape terminates at the edge of the article or a certain distance from the edge. It is, therefore, another object of my invention to devise a tape-sticking machine suitable for the last-mentioned purposes, that is for sticking adhesive tape flat onto a drawing sheet or other article.

A tape-sticking machine according to the invention, therefore, can be used for several purposes, but requires only a slightly higher expenditure than one of the previously known edge-framing machines. While it is thus possible to manufacture it at economic cost, the machine offers to the user the advantage that he does not have to keep several types of machines available in his filing department for drawings or the like.

These and more specific objects, advantages and features of my invention will be apparent from the following description in conjunction with the accompanying drawings, in which:

Figure 1 represents a two-dimensional article framed at the edge by an adhesive tape.

Figure 2 is a section on the line II—II of Figure 1;

Figure 3 shows an article to which a carrier strip is fixed by means of adhesive tape, the carrier strip being shown in the position in which it leaves the machine;

Figure 4 is a section on the line IV—IV of Figure 3;

Figure 5 shows the article with the carrier strip attached according to Figures 3 and 4, but illustrating the strip in the hinged "open" position;

Figure 17A:
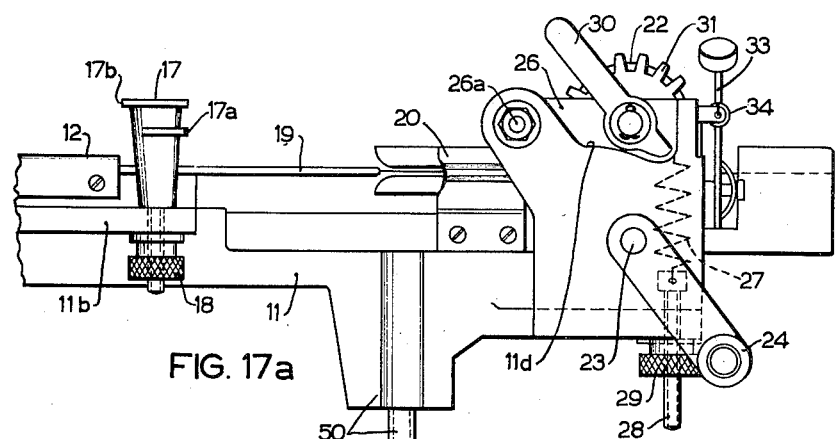
Figure 18A:
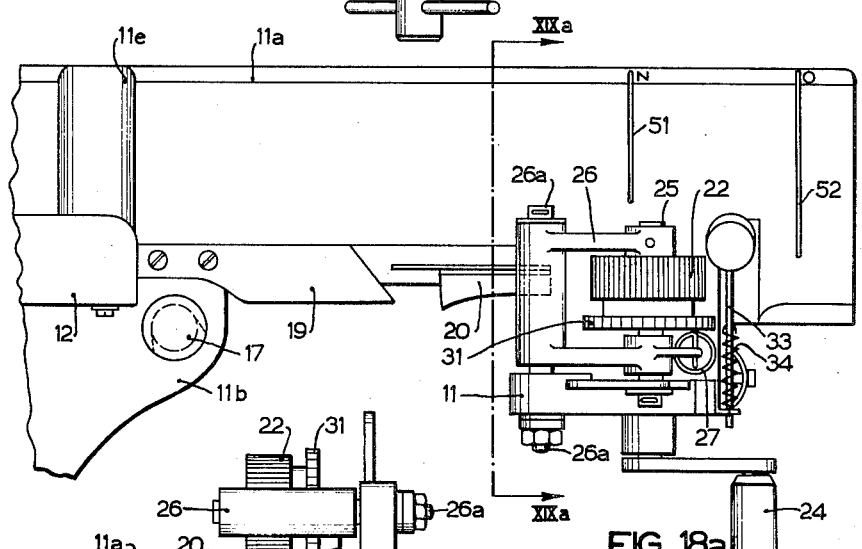
Figure 19A:
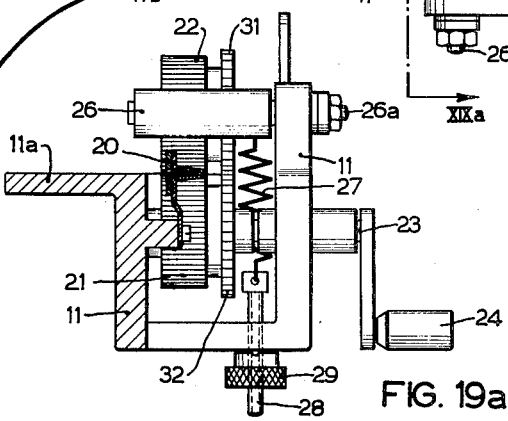

Figue 6 is a section on the line VI—VI of Figure 5;

Figure 7 is a plan view on the adhesive side of the self-adhesive tape used with the article according to Figures 5 and 6;

Figure 8 shows an article having an adhesive tape applied thereto so that the tape terminates at the edge of the article;

Figure 9 is a section on the line IX—IX of Figure 8;

Figure 10 and 11 are views corresponding to Figures 8 and 9, but with the difference that a narrow marginal zone of the article is left free of adhesive tape;

Figure 12 is a plan view of an embodiment of a machine according to the invention;

Figure 13 is a section on the line XIII—XIII of Figure 12;

Figure 14 is a side elevation of elements shown in Figure 12;

Figures 15 and 16 are cross-sections showing on a larger scale, the carrier strip spool, with and without a spacing member, respectively;

Figure 17a is a side elevation showing on a larger scale part of the embodiment, illustrated in Figure 12;

Figure 18a is a plan view of the embodiment of Figure 17a;

Figure 19a is a section on the line XIXa—XIXa of Figure 18a;

Figure 17 is a side elevation, on a larger scale, of part of the device shown in Figure 12, but with the folding nozzle replaced by a tape guiding member;

Figure 18 is a plan view corresponding to Figure 17;

Figure 19 is a section on the line XIX—XIX of Figure 18;

Figures 20 and 21 show an embodiment of a tape-guiding member in front elevation and side elevation respectively;

Figure 22 is a front elevation of a tape-guiding member for less acute bending than that according to Figures 20 and 21;

Figures 23 and 24 are a front elevation and plan view, respectively, of one embodiment of fastening means facilitating the exchange of the tape-guiding member and the folding nozzle; and Figures 25 and 26 are side elevations of a tape guiding member and a folding nozzle, respectively, with slots for securing and adjusting purposes.

As mentioned, a machine according to the invention can be used in the same way as the known edge-protecting machines, namely for framing a sheet 1, such as a drawing, according to Figures 1 and 2 by an adhesive tape 2 which extends along the edges of the sheet. Preferably employed is a self-adhering tape which, due to the nature of the adhesive (usually a rubber adhesive, particularly an adhesive having a natural rubber base), not only retains its adhering property when stored a relatively long period, but adheres "automatically" without the necessity of using water, heat or other means to produce adherence.

If a carrier strip is to be fastened to a two-dimensional article, such as a drawing, as shown in Figs. 3 and 4, the machine introduces a carrier strip 3 from a roll 300 together with the sheet 1 into the crease or fold of an adhesive tape 2, so that, ultimately, by means of a pressure device, the carrier strip 3 and the sheet 1 are connected with each other by the adhesive tape 2 which is placed around the two parts so as to straddle them. The respective parts leave the machine in a position relative to each other as shown in Figures 3 and 4. Thereafter, the carrier strip 3 is turned outward as shown in Figures 5 and 6 and is provided with holes 3a. The complete structures can then be suspended or otherwise filed in suitable drawing cabinets or the like by using the openings 3a. In the alternative, the openings may be provided in the carrier strip 3 prior to connecting it with the sheet 1. In this case, however, it is important that the carrier strip 3 and its holes 3a have a predetermined position relative to the sheet 1. This can easily be achieved, as will be subsequently described. As shown by Figures 5 and 6, it is unavoidable that some space is left between the sheet 1 and the carrier strip 3. Even though this space may be relatively narrow, it may cause, nevertheless, an undesirable sticking together of the adhesive tape if the tape has a coating of adhesive on the central section which bridges the said space or gap. For this reason, it is advisable to use an adhesive tape which, according to Figure 7, for a suitable width is free from adhesive in the central zone 2a. It is also advantageous to keep narrow marginal zones 2b free from adhesive as shown in Fig. 7, so that adhesive does not issue laterally from the adhesive-tape roller.

Figures 8 and 9 illustrate the alternative in which an adhesive tape 2' is fastened flat to the sheet in such manner that the outer end of the tape 2' exactly coincides with the edge of the sheet 1. In Figures 10 and 11, an adhesive tape 2' is fastened to the sheet 1 in such a manner that a marginal zone 1' of the sheet 1 is left free. The width of this marginal zone 1' may be of any desired size according to any particular requirements.

As stated before, the machine according to the invention permits the application of adhesive tape to a two-dimensional article in the manner indicated in Figures 1 to 6 and Figures 8 to 11.

Referring now to the construction of the tape-sticking machine according to Figures 12 to 19, a base member 11 forms a supporting table for the sheet at 11a (Figs. 12, 18a, 19a). This table is bordered along part of its length by a stop bar 12 which is secured to the base member 11, for example, by means of screws. This bar is curved towards the supporting table 11a and thus forms a stop and also a slot-like guide plate for the sheet and, as will be shown, also for the carrier strip.

For receiving a roll 200 of adhesive tape 2, a bearing arm 11b with a hollow supporting core 11c is fastened on the base member 11 (Fig. 12). The roll of adhesive tape is wound about a spool 14 of cardboard or the like. The internal diameter of spool 14 is larger than that of core 11c so that a braking member 15 can engage the spool 14 from the inside. The braking member 15 passes through a slot of the supporting arm 11b and is secured to a lever which in turn is pivotally mounted on the supporting arm 11b and is under the action of a tension spring 16 fastened at one end to the supporting arm 11b and at the other end to the lever.

For inserting the supply roll 200 of adhesive tape 2, the braking member 15 is pivoted by hand into one end position and is released after the roll of tape has been placed in position. Under the action of the spring 16, the braking member 15 bears against the spool 14 and thus exerts a slight braking action on the roll of tape so that, although the tape can easily be drawn off, the roll is prevented from turning on its own. In addition, since the machine is in the horizontal position when in use, the roll 200 of tape 2 is held on core 11c by its own weight. This has the advantage that, if desired, rolls of adhesive tape of different widths can be placed into the machine.

For guiding and deflecting the adhesive tape 2, a deflecting pin 17 is fastened to the supporting arm 11b of base member 11. This pin may be arranged for different widths of tape or there may be provided a set of interchangeable deflecting pins having, respectively, different guiding widths. In the embodiment shown, the deflecting pin 17 illustrated in Figures 13 and 17 is arranged for tapes of two different widths. For this purpose it comprises a stop flange 17a extending over 180° of its circumference and a guide flange 17b at its upper end which extends over its entire circumference. After loosening the nut 18, the deflecting pin 17 can be rotated about its axis relative to the base member 11. In the position according to Figure 13, the pin 17 is adjusted for a large width of the tape. In this case, the adhesive tape 2 is guided between the supporting arm 11b of the base member 11 and the upper guide flange 17b. In the other position, a narrower tape is held between the supporting arm 11b of the base member 11 and the guide flange 17a. The pin 17 is tapered inwardly slightly in the downward direction. This counteracts any tendency of the tape 2 to bear with some pressure against the flange 17a or against the flange 17b and prevents compression or corrugation of the adhesive tape in its transverse direction.

From the deflecting pin 17, the tape 2 runs past a finger 19 which prepares the following or creasing of the tape. This finger is fastened to the base member 11. The tape then reaches a groove shaped folding nozzle 20 also fastened to the base member 11. In the nozzle, the tape is creased about its center line but the halves are not placed together. Therefore, although the tape 2 leaving the folding nozzle 20 is already folded, it is still open and has the shape of a groove. As next element in the direction of passage of the self-adhering tape 2, there follows a pressure device by which the pre-creased tape is pressed against a sheet and a carrier strip entering the pressure device in order to securely connect the self-adhering tape 2 with the sheet 1, or with the sheet 1 and the carrier strip 3.

In the embodiment illustrated, the pressure device comprises a feed roller 21 and a pressure roller 22. As shown, both rollers may be serrated, whereby a proper feeding of the parts gripped by the pressure device is assured. In addition, a slight corrugation of the parts as a result thereof tends to improve the adherence between the respective parts. As shown particularly in Figures 17 to 19, the shaft 23 of the feed roller 21 is mounted on the base member 11 and is connected with a hand crank 24 for the operation of the feed roller 21. The spindle 25 of the pressure roller 22 is mounted in a bearing fork 26. Fork 26 is secured to a spindle 26a mounted on the base member 11. The bearing fork 26 is engaged by one end of a tension spring 27 which is anchored at the other end on a screw bolt 28. The bolt 28 is movably guided through a bore in the base member 11 and is held in position by a nut 29. As will be subsequently shown, the tension of spring 27 and thus the bearing pressure of the roller 22 can be adjusted within given limits by rotating the nut 29.

By means of a lever 30 which is mounted on the spindle 25 and which co-operates with a guide surface 11d (Figure 17) of the base member 11, the bearing fork 26 can be raised, whereby the pressure roller 22 is lifted. This is used when the leading end of the adhesive strip is threaded between the rollers 21 and 22.

However, the pressure roller 22 can at the same time be used as a feed roller. For this purpose, as will be apparent more particularly from Figure 19, the pressure roller is coupled with the driving shaft 23 by means of the gear wheel 31 connected therewith and the gear wheel 32 connected with the roller 21.

Arranged behind the rollers 21 and 22 is a pivoted blade or knife 33 which assumes a rest position under the action of a tension spring 34. Overcoming the spring tension, the knife can be pivoted into the path of the adhesive strip. The knife is used as soon as the rear corner of the sheet has passed through the opening provided for the knife; consequently, the adhesive strip which may include the carrier strip 3 is always cut off immediately behind the sheet.

A receiving device in form of a spool, serving to accommodate the supply of carrier strip, is detachably connected at the rear end of the machine to the base member 11. As will be shown below, this spool may also be used for accommodating a roll of adhesive tape when it is desired to apply adhesive tape according to Figures 8 to 11 flat on a two-dimensional article, such as a drawing. The use of the spool for receiving the carrier strip, however, will be considered first. As will be seen from Figures 12, 14, 15 and 16, the spool for the carrier strip is seated upon a screw bolt 36 and fastened by a nut 37; the spool is composed of two lateral discs 38 and 39 and an interchangeable spool core 40. A supporting arm 41 is connected with the disc 39. Arm 41 is forked at the outer end (Fig. 14) so as to form a recess 41a for straddling a screw bolt 42 secured to the base member 11. Arm 41 can be secured in position by tightening a nut 43 on bolt 42. To prevent pivoting of the supporting arm 41, the base member 11 has a stop 44 against which the supporting arm 41 bears, as shown in Figures 12 and 14. Connected with the supporting arm 41 is a deflecting pin 45 for the carrier strip 3 shown in broken lines. Deflecting pin 45 is so arranged that, with the spool in operative position, the carrier strip 3 travels within the slot formed between the supporting table 11a and the bent stop bar 12 (see Figure 14) and bears flush against the stop formed by the part 12. The deflecting pin 45 also prevents rotation of the spool disc 38 and 39 (see Figure 14).

It has been mentioned that adhesive tapes 2 of different respective widths may be used. This applies also to the carrier strip 3. For this purpose, a set of spool cores of different width can be provided. To shorten the time needed for tightening of the nut 37, which is preferably knurled, the nut is drilled out over a part of its length to more than the external diameter of the screw thread. In order to insert a larger spool core 40, the nut 37 is simply turned around (see Figures 15, 16). Since the position of the disc 39 and of the associated support 41 is not affected by any exchange of the spool core 40, a wide carrier strip can be guided flush with the stop bar 12 in the same manner as a narrow strip.

To facilitate inserting the carrier strip 3 and the sheet 1, a transverse trough-shaped depression 11e is arranged in the table 11 near the forward end of the stop bar 12 (seen in the feeding direction). This permits the sheet 1 and the carrier strip 3 to bend downward in the region of the depression 11e to facilitate threading these parts through the slot-like guide formed between the supporting table 11a and the stop bar 12.

If the machine is to be used merely as an edge-protecting machine, the spool 36—41 is either removed, or it is left on the machine but the carrier strip 3 is not "threaded" into the machine. The adhesive tape 2 is threaded as described above and shown in Figure 12; that is, the adhesive tape is guided about the pin 17, through the creasing nozzle 20 and between the rollers 21 and 22. The sheet or other two-dimensional article is advanced across the table 11a in contact with the stop bar 12 until it reaches the rollers 21 and 22 whereupon the roller 22, driven by the hand crank 24, imparts feeding movement to the tape and at the same time urges the tape, initially creased at 19 and 20, against the sheet in order to unite the two, as shown in Figures 1 and 2.

The machine may be connected in any suitable manner with a working table or the like, for example by means of screws or, as shown in Figure 13, by means of a clamp 50 connected with or forming part of the base member.

If a carrier strip is to be joined with a sheet of drawing or the like, the carrier strip 3 is introduced into the machine between stop bar 12 and table 11a, and thereafter the strip is pulled forward until it enters, together with the tape 2, between the rollers 21 and 22. Since the carrier strip 3 has no adhesive, the sheet article can readily be pushed behind the carrier strip and thus be guided up to the rollers 21 and 22. The rollers 21 and 22, driven by crank 24, then cause any further feeding movement and simultaneously cause the adhesive tape 2 to join the carrier strip 3 with the article 1, as shown in Figures 3 and 4.

After the sheet has travelled through the machine, the carrier strip and the adhesive tape are severed by means of a pivoted knife 33 directly at the rear edge of the sheet. Thereafter, the carrier strip 3 is hinged upwardly in accordance with Figures 5 and 6 and can be punched for providing the necessary file-fastener holes 3a.

It has been mentioned that the carrier strip 3 can be provided in advance with the holes 3a. In this case, however, the carrier strip 3 must assume a predetermined position relatively to the sheet to which it is to be fastened, in order to arrange the holes 3a in proper position. For this purpose, it suffices to arrange suitable markings, for example, in the form of lines 51 and 52 (see Figures 12 and 18) on the supporting table 11a. These lines are used in such manner that the line 52 (seen in the feeding direction) coincides with a hole of the carrier strip at the forward end. In this position of the carrier strip 3, the sheet is advanced with its forward edge up to the mark 51, that is, into the position at which the sheet commences to be gripped by the rollers 21 and 22. If, as will generally be the case, the carrier strip does not assume from the outset the require position as indicated by the marking 52, then the carrier strip 3 is advanced into the required position by operating the hand crank 24. Only thereafter is the sheet 1 brought to the mark 51, the carrier strip remaining stationary during this time. Generally, the carrier strip will comprise equally spaced file-fastener holes. If for any reasons this should not be desired, it is possible, by applying suitable impressions or lines, to indicate the position of differently located holes, using the line 52 as a reference mark.

Since those parts of the carrier strip and of the adhesive tape that are cut off by knife 33 beyond the front edge and the rear edge of the sheet 1 are wasted, it is advisable to assure that, after each operation, the carrier strip needs to be advanced as little as possible until it reaches the required position in relation to the mark 52. This can be achieved by shortening the necessary hole spacing of the carrier strip, for example, to one-half or one third. The section of carrier strip joined with the article then contains more holes than necessary for filing purposes. However, this is not harmful, since it is only necessary to use those holes which correspond to the layout of the filing cabinet.

The mark 52 may also be given circular or arcuate shape in such a manner that the carrier strip assumes the correct position when a hole or a hole area coincides with the circular or arcuate mark. It is also possible to provide marking windows in the table 11a and direct a light beam or beams against these windows so that the markings 51 and 52 are illuminated in slot form or in circular form or the like by light shining through. Furthermore, the marks 51 and 52 may consist of structural stops. For instance, the mark 52 may consist of a pin. These stops are then arranged in such a manner that they can be lowered within the surface of the table 11a as soon as the necessary relative position between the carrier strip 3 and the sheet 1 is established.

Obviously, it is desirable to minimize the waste of adhesive tape and carrier strip. While an appreciable amount of such waste was inevitable with the known tape-sticking machines, considerable savings in material are afforded in machines according to the invention by virtue of the arrangement of the rollers 21 and 22 as shown in Figures 12 and 18. This arrangement permits mounting the pivoted knife 33 almost immediately behind the rollers 21 and 22. Therefore, the piece of the adhesive tape 2 projecting beyond the forward end and the piece of tape projecting beyond the rear end of the sheet 1, and the corresponding pieces of carrier strip 3, are much smaller, thus reducing the cutting losses to a very small amount.

For applying the machine for the purposes described above with reference to Figures 8 to 11, the carrier strip roll 300 is replaced by a roll 200' of adhesive tape 2'. As will be seen from Figure 14, this roll is preferably so mounted that, when the adhesive tape is being drawn off, the roll will rotate counterclockwise as shown. In contrast thereto, if this roll, as ordinarily, is used to supply a carrier strip, the latter is drawn off while the roll is rotating in clockwise direction. Furthermore, the detachably arranged folding nozzle 20 is interchanged for a tape-guiding member 60 of the form shown in Figures 20 and 21. The holding portion of this guide member is bent so as to guide the tape 2' in such manner that, as apparent from Figures 17 and 18, 8 and 9, the adhesive tape 2' is fastened flat to the sheet 1, with its outer edge coinciding with the edge of the sheet 1. When using the machine in this manner, the adhesive tape roll 2 carried by the supporting arm 11b (see Figure 12) is not used and can be omitted.

The bending of the tape guide member 60 can be effected to a different extent with different results. Figure 22 shows a guide 60' which has a less pronounced bending than the guide according to Figure 20. Consequently, it displaces the adhesive tape guided by it toward the left with reference to the right edge of the sheet, substantially as shown in Figures 10 and 11. A spacing disc 61 is then preferably arranged adjacent to the spool core 40, as shown in Figure 16. The width of the spacing disc corresponds to the lateral displacement of the guide 60 according to Figure 22, so that the adhesive tape 2' travels from the adhesive tape roll without lateral deflection into the guide 60' and, as stated, maintains relative to the sheet 1 a position as shown by Figures 10 and 11. The lateral displacement of the adhesive tape 2' relative to the sheet can be given any desired magnitude. Accordingly, the invention provides for a set of tape guides 60, 60' etc., which are offset respectively different extents, and also a corresponding set of spacing washers 61 of different thicknesses. The rollers 21 and 22 are made so wide that, notwithstanding any lateral displacement of the adhesive tape 2' and with the maximum applicable tape width, the adhesive tape is still gripped by the rollers 21 and 22, preferably over its full width. If the machine is to be utilized only for the purposes described with reference to Figures 1 to 7, the rollers 21 and 22 can be made narrower, as shown for example in Figures 18a and 19a. Aside from these, Figures 17a to 19a differ from Figures 17 to 19 in that the last-mentioned figures show the strip-guiding member 60 inserted in place of the folding nozzle 20 shown in Figures 17a to 19a.

In the construction according to Figures 12 to 22, the folding nozzle 20 and accordingly the tape guides 60, 60' are detachably secured by means of two screws to the base member or to a suitable projection of the base member. In order to facilitate the change-over, it is advisable to use the arrangement according to Figures 23 and 24. Accordingly, a pin 62 is secured to the base member 11. Pin 62 is in threaded engagement with a nut 63 bearing against a pressure member 64. The member 64 is bent at one end so as to form a lug which rests against the base 11. The member 64 has two holes by means of which it can be placed onto two respective pins 65 and 66 extending from the base member 11. The tape guide 60 and the folding nozzle 20 have corresponding holes so that they can be placed onto the pins 65 and 66 and can be clamped between the base member or its projection and the pressure member 64. For changing-over purposes, the nut 63 is loosened until the pressure member 64 clears the pins 65 and 66 and can be pivoted about the pin 62. The tape guide can then be replaced by another guide or by a folding nozzle or else one folding nozzle can be replaced by another folding nozzle. Thereafter, the substituted part is fastened by again placing the pressure member 64 into engagement with the pins 65 and 66, and clamping the substituted nozzle or tape guide in position by tightening the nut 63.

In order to make vertical adjustments as shown in Figures 25 and 26, the tape guide 60" or the folding nozzle 20' are preferably provided with slots 60a" and 20a" respectively. In order to determine the basic adjustment, the base member is provided with a stop 67 against which the tape guide 60" or the folding nozzle 20' bears in the basic position (Figures 23 and 24). The setting of the required lateral displacement of the guide 60, 60' and the spool assembly 36 to 41 or the roll of adhesive tape supported by the latter, can also be arranged to provide for a constant adjustment of the lateral displacement; for example in such manner that the lateral displacement is set by means of a spindle and a travelling nut connected with the spool body and also a travelling nut connected with the strip guide. In this case, there is no need for different spacing members 61 (Figure 16) or for a set of different tape guides, at least not for the same width of adhesive tape. In general, however, a lesser expenditure is necessary for the arrangement shown in the drawing.

Although it is advantageous, but not absolutely necessary, to provide for an interchange of the folding nozzle with the tape guide and vice versa, there also exists the possibility of leaving the folding nozzle in the machine and additionally providing a tape guide or several guides if required. If the folding nozzle should be obstructive, it can be arranged so that it can be lowered or pivoted into operative position. Again, however, the construction shown in the drawing is simpler.

Depending upon the main purpose of use the purchaser has in mind, the herein disclosed machine can initially be supplied with only one folding nozzle or a set of folding nozzles or only with one tape guide or a set of strip guides and suitable spacing washers 61. It is then always possible for the user to acquire other parts if and when required. Similar considerations apply with respect to the supporting arm 11b and the parts associated therewith. This supporting arm 11b may be constructed as a separate part which is detachably connected with the base member and is subsequently supplied, if necessary, when the machine is at first merely intended for such purposes apparent from Figures 8 to 11.

If desired, there may be provided a plurality of spool bodies for accommodating rolls of carrier strip 3 or rolls of adhesive tape 2', in the latter case with appropriately fitted spacing washers 61.

In addition to self-adhesive tape, it is also possible to use other adhesive tape, for example, those in which the adhesive action is produced by supplying heat.

It has been mentioned above that adhesive tapes and carrier strips of different widths can be used with the new machine. For example, an adhesive tape of 13 mm. width is sufficient for many purposes. If a wider adhesive tape is used, for example a strip 20 mm. wide, the deflecting pin 17 is turned over, as already mentioned, or replaced by another pin, and in addition the folding nozzle 20 is also replaced. This is possible because the folding nozzle 20 is detachably connected with the base member 11. By suitably bending the holder of the folding nozzle 20 (see Figure 19a) it is always possible to easily adjust the folding nozzle 20 into a correct position.

A strip 20 mm. wide is usually sufficient for the carrier strip 3. If a carrier strip is provided which is 50 mm. wide and which is then used with the 20 mm. adhesive tape, it is possible to satisfy most practical requirements. It is advisable to use thin, non-tearing paper for the carrier strip although any other suitable materials may also be employed.

I claim:

1. A machine for applying adhesive tape to a flat article, comprising a base structure having a supporting surface for the article, an adhesive-tape holding mechanism mounted on said structure and operative to support a roll of adhesive tape, pressure means engageable with said tape for feeding it from said holding mechanism onto the article, tape folding means mounted on said structure between said holding means and said pressure means and engageable with the tape being fed, said tape folding means being operative to fold said tape around the edge of the article, and a strip supply device detachably mounted on said structure at the end of said supporting surface and at the side of said holding means remote from said folding means, said strip supply device being operative to support a roll of strip material, said structure having guide means engageable with the strip material and extending along said surface between said strip supply means and said folding means for passing the strip material flat into the fold of said tape, whereby the strip material is joined with the article by said tape when the article and tape and strip material pass through said pressure means.

2. A machine for applying adhesive tape to a flat article, comprising a base structure having a supporting surface for the article, tape supply means and strip supply means both mounted on said structure and selectively operable singly and together, said tape supply means being operative to receive a roll of adhesive tape to be folded over the edge of the article, said strip supply means being operative to receive a roll of strip material to be placed flat along the edge of the article, feed means mounted on said structure and engageable with said tape and strip material for feeding it onto the article, folding means disposed between said tape supply means and said feed means and engageable with said tape, said feed means comprising a pivot mounted on said structure, a lever fulcrumed on said pivot, a pressure roller for engagement with said tape, said pressure roller being journalled on said lever, and a biasing spring connected with said lever for urging said pressure roller toward the tape, said pivot being located in front of said pressure roller seen in the direction of feed.

3. A machine for sticking an adhesive strip to a two-dimensional article, comprising a base structure forming a supporting table for the article, a device for accommodating a supply roll of carrier strip having punched holes equally spaced from each other in the longitudinal direction of the strip, a device for accommodating a supply roll of adhesive tape, a folding device, said three devices being mounted on said structure above the top surface of said table, and means for feeding the two strips together with the article to said folding device for folding the adhesive tape around the edge of the article and the carrier strip, said supporting table having marking elements determining the proper initial position of the carrier strip relative to the article, whereby said holes of the carrier strip are placed into a fixed relation to the article.

4. A machine for applying adhesive tape to a marginal surface of a flat article and to a strip to join them together, comprising a base structure providing a longitudinal supporting surface for the article, a tape supply means including a roll and a strip supply means including a roll mounted upon said machine, the strip supply means positioning the strip edgewise of and facing a surface of the article, one overlying the other, means to fold the adhesive tape lengthwise and to position its adhesive surface lengthwise of the edge of the article and the strip, the strip and the article traveling together longitudinally into the fold of the adhesive tape, and means for advancing the article, the strip, and the tape, and for pressing the folded tape into adhering and joining contact with the article and the strip, the strip and the article remaining unjoined to each other at their overlying surfaces, whereby, subsequent thereto, the strip and the article joined thereto can be unfolded.

5. A machine for applying adhesive tape to a marginal surface of a flat article and to a strip to join them together, comprising a base structure providing a longitudinal supporting surface for the article, a tape supply means including a roll and a strip supply means including a roll mounted upon said machine, the strip supply means positioning the strip edgewise of and facing a surface of the article, one overlying the other, means to fold the adhesive tape lengthwise and to position its adhesive surface lengthwise of the edge of the article and the strip, the strip and the article traveling together longitudinally into the fold of the adhesive tape, and means for advancing the article, the strip, and the tape, and for pressing the folded tape into adhering and joining contact with the article and the strip, the strip and the article remaining unjoined to each other at their overlying surfaces, whereby, subsequent thereto, the strip and the article joined thereto can be unfolded, guide means for guiding the article in the direction of advance, guide means for guiding the strip to be fed flat along the edge of the article, said two guide means being mounted on said structure and displaceable relative to each other in a direction transverse to the guiding direction for adjusting a desired lateral displacement of the strip relative to the article.

6. A machine for applying adhesive tape to a marginal surface of a flat article and to a strip to join them together, comprising a base structure providing a longitudinal supporting surface for the article, a tape supply means including a roll and a strip supply means including a roll mounted upon said machine, the strip supply means positioning the strip edgewise of and facing a surface of the article, one overlying the other, means to fold the adhesive tape lengthwise and to position its adhesive surface lengthwise of the edge of the article and the strip, the strip and the article traveling longitudinally into the fold of the adhesive tape, and means for advancing the article, the strip, and the tape, and for pressing the folded tape into adhering and joining contact with the article and the strip, the strip and the article remaining unjoined to each other at their overlying surfaces, whereby, subsequent thereto, the strip and the article joined thereto can be unfolded, a set of different tape guides interchangeable with one another and mounted on said structure, said tape supply means having a spool for accommodating said roll of tape, and spacing washer means adjacent to said roll for adjusting the lateral displacement of the tape relatively to the article.

7. A machine for applying adhesive tape to a marginal surface of a flat article and to a strip to join them together, comprising a base structure providing a longitudinal supporting surface for the article, a tape supply means including a roll and a strip supply means including a roll mounted upon said machine, the strip supply means positioning the strip edgewise of and facing a surface of the article, one overlying the other, means to fold the adhesive tape lengthwise and to position its adhesive surface lengthwise of the edge of the article and the strip, the strip and the article traveling longitudinally into the fold of the adhesive tape, and means for advancing the article, the strip, and the tape, and for pressing the folded tape into adhering and joining contact with the article and the strip, the strip and the article remaining unjoined to each other at their overlying surfaces, the base structure also providing a longitudinal edge guide surface to assist in positioning the strip with relation to the article.

8. A machine for applying adhesive tape to a surface of a flat article, comprising a base structure having a supporting surface for the article, an adhesive-tape holding mechanism adapted to support a roll of adhesive tape and being mounted on said structure, pressure means engageable with said tape for advancing it from said holding means onto the article, tape folding means mounted on said structure between said holding means and said pressure means and engageable with the tape being fed, a strip supply device detachably mounted on said structure for selective use and adapted to support a roll of strip material, said tape folding means being operative to fold said tape around the edges of the strip and the article, said structure having guide means engageable with the strip material and extending along said surface between said strip supply means and said folding means for passing the strip material edgewise of and facing the surface of the article and, together with article, into the fold of said tape, to join the article by said tape to the strip material when the article, tape, and strip pass through said pressure means.

9. A machine for applying adhesive tape to a marginal surface of a flat article and to a strip to join them together, comprising a base structure providing a longitudinal supporting surface for the article, a tape supply means including a roll and a strip supply means including a roll mounted upon said machine, the strip supply means positioning the strip edgewise of and facing a surface of the article, one overlying the other, means to fold the adhesive tape lengthwise and to position its adhesive surface lengthwise of the edge of the article and the strip, the strip and the article traveling longitudinally into the fold of the adhesive tape, and means for advancing the article, the strip, and the tape, and for pressing the folded tape into adhering and joining contact with the article and the strip, the strip and the article remaining unjoined to each other at their overlying surfaces, the base structure also providing a longitudinal edge guide surface to assist in positioning the strip with relation to the article, said strip supply device comprising a holder for accommodating said roll of strip material, said holder being bifurcated at one end, a screw bolt mounted on said structure and straddled by said bifurcated end, and a nut on said bolt fixing said bifurcated end to said structure, said structure having a stop engaged by said holder for locking it against rotation.

10. A machine for attaching a carrier strip along the edge of a flat article, comprising a base structure having a longitudinal supporting surface for the article, a carrier-strip supply mechanism mounted on said structure, said mechanism comprising adjustable means for selectively accommodating rolls of carrier strip material of respectively different widths, a tape supply mechanism mounted on said structure and operative to revolvably support a roll of adhesive tape to be folded over the edge of the strip and the article, guide means mounted on said structure and engageable with said tape and strip material for guiding them to the article, and folding means disposed between said tape supply mechanism and said feed means and engageable with said tape to fold the latter, the carrier-strip and the article overlying one another, the strip and the article being advanced longitudinally into the fold of the tape.

11. In a machine according to claim 10, said strip supply mechanism comprising a screw bolt, a spool core and two spool discs mounted on said bolt on both axial sides respectively of said core, and a nut in threaded engagement with said bolt, said nut having a threaded portion extending over only part of the axial length of said nut, whereby said spool core can be exchanged for a core of different axial width by reversing said nut on said bolt.

12. A machine for sticking an adhesive strip to a substantially two-dimensional article, comprising a base structure having a supporting surface for the article, a device for accommodating a supply roll of carrier strip, a device for accommodating a supply roll of adhesive tape, said two devices being mounted on said structure above said surface, a folding device mounted on said structure in a position to fold the adhesive tape around the edges of the article and the carrier strip, said structure having at said surface a stop bar and a slot guide operative to guide the edges of the article and the carrier strip into said folding device, said supporting surface having a transversely extending recess near the forward end of said stop bar seen in the direction of feed for facilitating insertion of the carrier strip and the article into the slot guide, and roller means for pulling the taped article and carrying strip through said folding device and for pressing the tape around the said edges of the article and carrier strip.

13. A machine for attachment of a carrier strip to a two-dimensional article by means of an adhesive strip, comprising a base structure forming a supporting table for the article, a device for accommodating a supply roll of the carrier strip having punched holes spaced from each other in the longitudinal direction of the strip, a device for accommodating a supply roll of adhesive tape, a folding device, said three devices being mounted on said structure above the top surface of said table, and means for feeding the two strips together with the article to said folding device for folding the adhesive tape around the edge of the article and the carrier strip, said supporting table having marking elements determining the proper initial position of the carrier strip relative to the article, whereby said holes of the carrier strip are placed into fixed relation to the article.

14. A machine for applying adhesive tape to a marginal surface of a substantially two-dimensional article and to a carrier strip to join them together, comprising a base structure having a supporting surface for the article, a device for accommodating a supply roll of carrier strip, said device feeding the strip longitudinally of and facing a surface of the article, a device for accommodating a supply roll of adhesive tape, said two devices being mounted on said structure, a folding nozzle mounted on said structure and engageable with the tape and operative to fold the tape around the edges of the article and the carrier strip, and means for moving the article, the tape, and the carrier strip through the folding device and for pressing them together, a deflecting pin on said structure for guiding the adhesive tape from its supply roll to the folding nozzle, said pin having a lower stop flange extending over part of the circumference of said pin and an upper stop flange and being adjustable by rotation to selectively place only one of said flanges into tape engaging position.

15. A machine for applying adhesive tape to a marginal surface of a substantially two-dimensional article and to a carrier strip to join them together, comprising a base structure having a supporting surface for the article, a device for accommodating a supply roll of carrier strip, said device feeding the strip longitudinally of and facing a surface of the article, a device for accommodating a supply roll of adhesive tape, said two devices being mounted on said structure, a folding nozzle mounted on said structure and engageable with the tape and operative to fold the tape around the edges of the article and the carrier strip, and means for moving the article, the tape, and the carrier strip through the folding device and for pressing them together, a deflecting pin on said structure for guiding the adhesive tape from its supply roll to the folding nozzle, said pin having a lower stop flange extending over part of the circumference of said pin and an upper stop flange and being adjustable by rotation to selectively place only one of said flanges into tape engaging position, the deflecting pin having a frustro-conical shape tapering toward said supporting surface.

16. A machine for applying adhesive tape to a marginal surface of a substantially two-dimensional article and to a carrier strip to join them together, comprising a base structure having a supporting surface for the article a device for accommodating a supply roll of carrier strip, said device feeding the strip longitudinally of and facing a surface of the article, a device for accommodating a supply roll of adhesive tape, said two devices being mounted on said structure, a folding device also mounted on said structure in advance of the adhesive tape supply roll and adjacent the side of the said supporting surface, said folding device being operative to fold the adhesive tape around the edges of the article and the carrier strip, said structure having at said surface a stop bar and slot guide operative to guide the edges of the article and the carrier strip into said folding device, said supporting surface having a transversely extending recess near the forward end of said stop bar seen in the direction of feed for facilitating insertion of the carrier strip and the article into the slot guide, and roller means for pulling the taped article and carrying strip through said folding device.

References Cited in the file of this patent

UNITED STATES PATENTS

| | | |
|---|---|---|
| 1,590,371 | Haren | June 29, 1926 |
| 2,209,692 | Fulk | July 30, 1940 |
| 2,213,157 | Brenn | Aug. 27, 1940 |
| 2,244,268 | Smeltzly | June 3, 1941 |
| 2,488,355 | Wagner | Nov. 15, 1949 |
| 2,541,444 | Storey et al. | Feb. 13, 1951 |
| 2,557,831 | Lucenti | June 19, 1951 |
| 2,634,438 | Pitner | Apr. 14, 1953 |
| 2,649,890 | Dunlap et al. | Aug. 25, 1953 |
| 2,663,352 | Keller | Dec. 22, 1953 |